(12) United States Patent
Schultz

(10) Patent No.: US 12,134,869 B1
(45) Date of Patent: Nov. 5, 2024

(54) ADAPTABLE AND REMOVABLE WINCH MOUNT

(71) Applicant: James R. Schultz, Carson City, MI (US)

(72) Inventor: James R. Schultz, Carson City, MI (US)

( * ) Notice: Subject to any disclaimer, the term of this patent is extended or adjusted under 35 U.S.C. 154(b) by 528 days.

(21) Appl. No.: 17/482,688

(22) Filed: Sep. 23, 2021

(51) Int. Cl.
*B60R 9/06* (2006.01)
*B60D 1/48* (2006.01)
*B60D 1/52* (2006.01)
*E01H 5/06* (2006.01)

(52) U.S. Cl.
CPC ............. *E01H 5/061* (2013.01); *B60D 1/485* (2013.01); *B60D 1/52* (2013.01); *B60R 9/06* (2013.01)

(58) Field of Classification Search
CPC ........................................................ B60R 9/06
USPC ................................................................ 403/353
See application file for complete search history.

(56) References Cited

U.S. PATENT DOCUMENTS

| | | | | |
|---|---|---|---|---|
| 5,224,728 A * | 7/1993 | Ball | ........................ | B60D 1/465 280/402 |
| 6,009,642 A * | 1/2000 | Nugent | ..................... | E01H 5/00 37/231 |
| 7,344,120 B2 * | 3/2008 | McFarland | .............. | B66D 1/00 254/323 |
| 7,703,834 B1 * | 4/2010 | Hardy | ................... | B60R 19/023 296/144 |
| 7,997,015 B2 * | 8/2011 | Belzile | .................... | A01B 59/06 37/231 |
| 8,820,718 B2 * | 9/2014 | Weidner | .................... | B66D 1/00 254/332 |
| 9,719,632 B2 | 8/2017 | Weidner | | |
| 10,493,905 B2 * | 12/2019 | Wilkins | .................... | B60Q 1/30 |
| 10,603,966 B2 | 3/2020 | Stojkovic et al. | | |
| 10,668,960 B1 | 6/2020 | Morrison, Sr. | | |
| D933,329 S * | 10/2021 | Lanini | ............................ | D34/33 |
| 2009/0115209 A1 * | 5/2009 | Roth | ........................ | B60R 9/06 293/155 |
| 2018/0147901 A1 * | 5/2018 | Cramp | .................... | B60R 19/48 |

\* cited by examiner

*Primary Examiner* — Scott T McNurlen
(74) *Attorney, Agent, or Firm* — Cramer Patent & Design PLLC; Aaron R. Cramer

(57) ABSTRACT

An adaptable and removable winch mount is an adapter that connects to an existing snowplow mount on a pickup truck which in turn allows for the attachment of a winch mount. The mount provides a seamless transition between the snowplow mount and the winch mount. The invention consists of two parallel steel plates that each connect to the plow mount via a pin lot and locking hole each. The plates are then interconnected by two steel tubes with a receiver hitch in the middle. The overall width of the invention is approximately thirty-three inches. This allows a standard hitch mount winch to then be attached to the invention in a typical manner.

17 Claims, 5 Drawing Sheets

ADAPTABLE AND REMOVABLE WINCH MOUNT

RELATED APPLICATIONS

Non-applicable.

FIELD OF THE INVENTION

The present invention relates generally to a winch mount and more specifically to a winch mount that is both adaptable and removable

BACKGROUND OF THE INVENTION

The popularity of the pick-up style truck as an everyday vehicle still remains high. Their power, four-wheel drive ability, off-road capability, and convenience in hauling items coupled with the availability of luxury interiors and extended cab space have made the pickup a popular alternative to other vehicles. The availability of aftermarket accessories also enhances the utility usefulness of pickup trucks as well. Perhaps two of the most common accessories are that of a winch and a snowplow. Snowplows can be used to clean one's own drive of snow as well as being used in a snow removal business.

Winches are commonly used to help pull the vehicle or other objects free in rough terrain such as stones, mud, and snow. However, both the snowplow and the winch share the same mounting location, namely the front of the vehicle. This means that much mechanical work is required to transition between the plow and the winch. This work translates into time, money, and additional wear and tear on the components with each removal and re-installation. Accordingly, there exists a need for a means by which both a snowplow and a winch can be used on a pickup truck without the work and aggravation associated with remounting each device. The development of the adaptable and removable winch mount fulfills this need.

SUMMARY OF THE INVENTION

To achieve the above and other objectives, the present invention provides for a snowplow mounting adapter that has, a front plate bordered by a pair of side mounting plates which are adapted to allow for connection of the snowplow mounting adapter to a snowplow mount, a winch cable opening bordered by a pair of attachment holes allowing for mounting of a winch behind the front plate, a standard receiver hitch disposed directly below the winch cable opening, a pair of first safety attachment points disposed inward from the pair of side mounting plates for attachment of one or more safety chains when using the receiver hitch, a winch mounting plate bordered by the pair of side mounting plates and the front plate, a set of 4 winch mounting holes disposed on the winch mounting plate to facilitate mounting of an aftermarket winch, a receiver tube attached underneath the winch mounting plate that terminate at the receiver hitch directly below the front plate and a hitch locking pin hole disposed on the receiver tube for the insertion of a conventional hitch locking pin.

The pair of side mounting plates may each include a top edge, a bottom edge, a forward-facing edge with a second safety attachment point, and a rearward facing edge with a lower pin slot. A top portion of the rearward facing edge may include a securing hole which is adapted to accept a locking pin from the snowplow mount. The securing hole may include an opening that is ¾ inch in diameter. The front plate may be 4 inches tall and 33 inches wide. The winch mounting plate may include a winch mounting space that accommodates the winch with the winch cable using the winch cable opening. The standard receiver hitch may include a diameter selected from the group consisting of 1¼ inches, 2 inches, 2½ inches, or 3 inches. The set of 4 winch mounting holes may be symmetrically disposed on the winch mounting plate. A top of the front plate may include a reinforcing lip for structural strength. The snowplow mounting adapter may be adapted to attach to the snowplow mount on a motor vehicle. The snowplow mounting adapter may be adapted to be installed on a front of the motor vehicle. The snowplow mounting adapter may include a receiver hitch and a platform for attaching the winch. The snowplow mounting adapter may be welded together. The snowplow mounting adapter may include a protective finish. The protective finish may be corrosion resistant paint. The protective finish may be corrosion resistant plating. The snowplow mounting adapter may allow for use of the winch and/or the receiver hitch simultaneously. The snowplow mounting adapter may further have a hitch locking pin hole disposed on the receiver tube to accommodate insertion of a conventional hitch locking pin. The snowplow mounting adapter may be made of high strength steel. The snowplow mounting adapter may be ⅜ inch thick.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
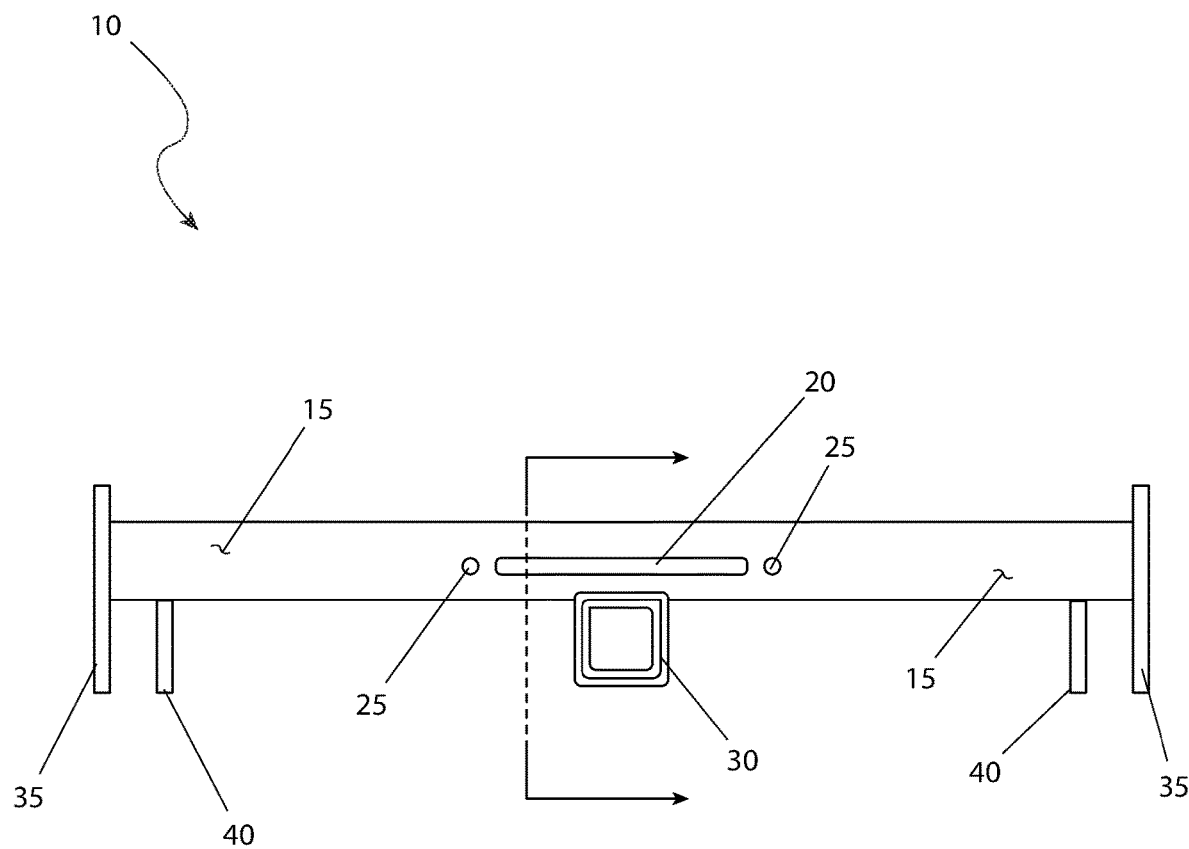
FIG. 1 is a front view of the snowplow mounting adapter 10, according to the preferred embodiment of the present invention.

- 10 snowplow mounting adapter
- 15 front plate
- 20 winch cable opening
- 25 attachment hole
- 30 receiver hitch
- 35 side mounting plate
- 40 first safety attachment point
- 45 top edge
- 50 bottom edge
- 55 forward facing edge
- 60 second safety attachment point
- 65 rearward facing edge
- 70 pin slot
- 75 securing hole 80 winch mounting plate
85 winch mounting hole
90 receiver tube
95 reinforcing lip
100 hitch locking pin hole
105 motor vehicle
110 snowplow mount
115 locking pin
120 winch mounting space
125 hitch body
130 hitch insertion path "i"

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) configuration shall be shown and described for purposes of clarity and disclosure and not by way of limitation of scope. All the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one of the referenced items.

1. Detailed Description of the Figures

Referring now to FIG. 1, a front view of the snowplow mounting adapter 10, according to the preferred embodiment of the present invention is disclosed. The snowplow mounting adapter (herein also described as the "adapter") 10, is adapted to attach to an existing snowplow mount 110 on a motor vehicle 105 and provides for a receiver hitch 30 and a platform for the attachment of a winch. A front plate 15 is centrally located at middle of the adapter 10. It is approximately four inches (4 in.) tall and thirty-three inches (33 in.) wide. A winch cable opening 20 is centrally located to allow for mounting of a winch behind the front plate 15. The winch cable opening 20 is bordered by two (2) attachment holes 25 for storage of a winch hook or similar items. Located directly below the winch cable opening 20 is a standard receiver hitch 30. The receiver hitch 30 may be of any size including one and one-quarter inch (1¼ in.), two inches (2 in.), two and one-half inches (2½ in.) and three inches (3 in.) in size. The use of any size of receiver hitch 30 is not intended to be a limiting factor of the present invention.

The front plate 15 is bordered by two (2) side mounting plates 35 which allow for connection of the adapter 10 to a snowplow mount 110. This connection will be provided in greater detail here in below. Finally, two (2) first safety attachment points 40 are provided directly inward from the side mounting plates 35 for attachment of safety chains when using the receiver hitch 30. It is envisioned that all components of the adapter 10 would be manufactured from high strength steel that is approximately three-eighths of an inch (⅜ in.) thick. Connections would be made by welding. After manufacture, a suitable protective finish such as paint or plating would be applied to all components to prevent corrosion.

Figure 2:
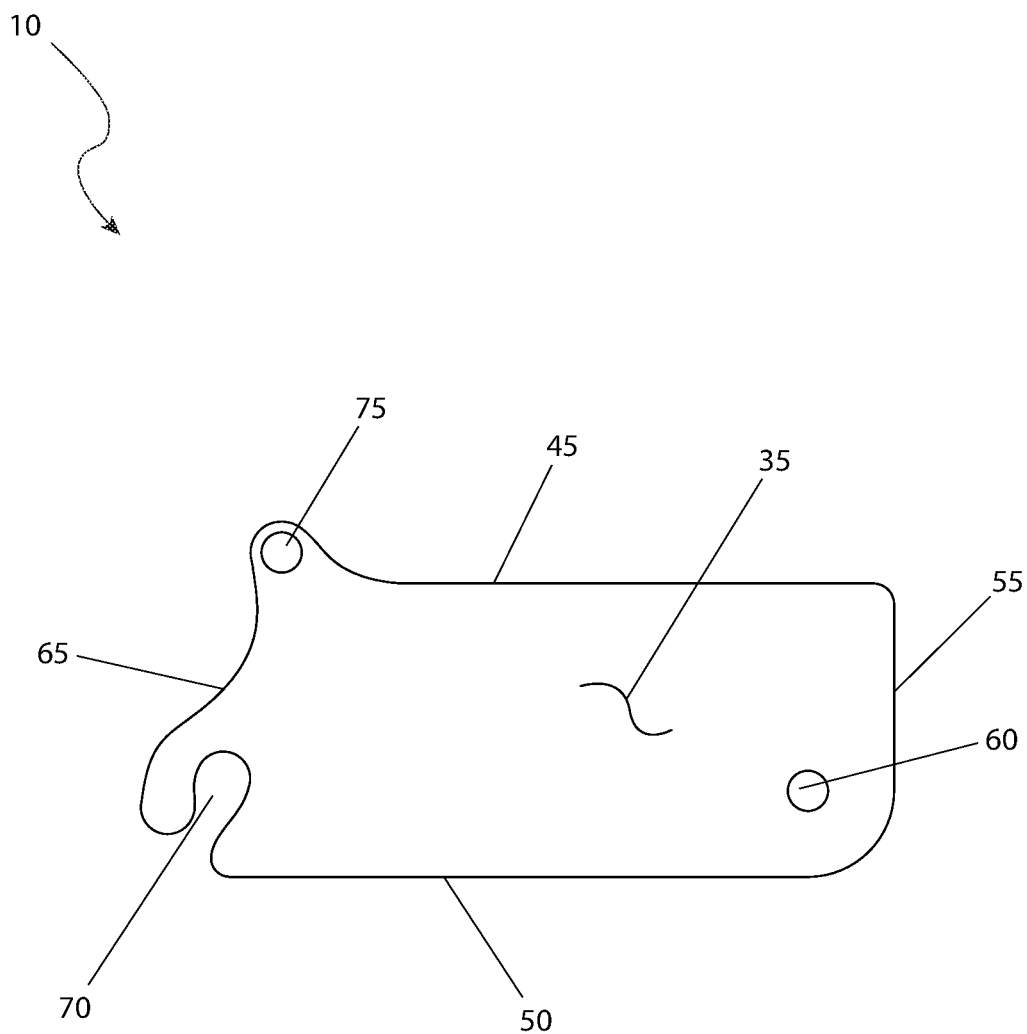
FIG. 2 is a side view of the snowplow mounting adapter 10, according to the preferred embodiment of the present invention.

Referring next to FIG. 2, a side view of the adapter 10, according to the preferred embodiment of the present invention is depicted. The attachment holes 25 shown are from one (1) side of the front plate 15 (as shown in FIG. 1). It is noted that the other attachment holes 25 is a mirror image of the one depicted in FIG. 2. Each side mounting plate 35 is approximately fourteen and a half inches (14½ in.) wide and seven and a quarter inch (7¼ in.) tall. Additionally, it is noted that the top edge 45 and the bottom edge 50 are parallel in nature. The forward-facing edge 55 is provided with a second safety attachment point 60. The second safety attachment point 60 works in a similar manner to the first safety attachment point 40 (as shown in FIG. 1). The rearward facing edge 65 is provided with a lower pin slot 70 that is provided with an opening that is approximately one inch (1 in.) in diameter. The top portion of the rearward facing edge 65 is provided with a securing hole 75 which accepts a locking pin from the snowplow mount 110. The securing hole 75 is envisioned to be provided with an opening that is three-quarters of an inch (¾ in.) in diameter.

Figure 3:
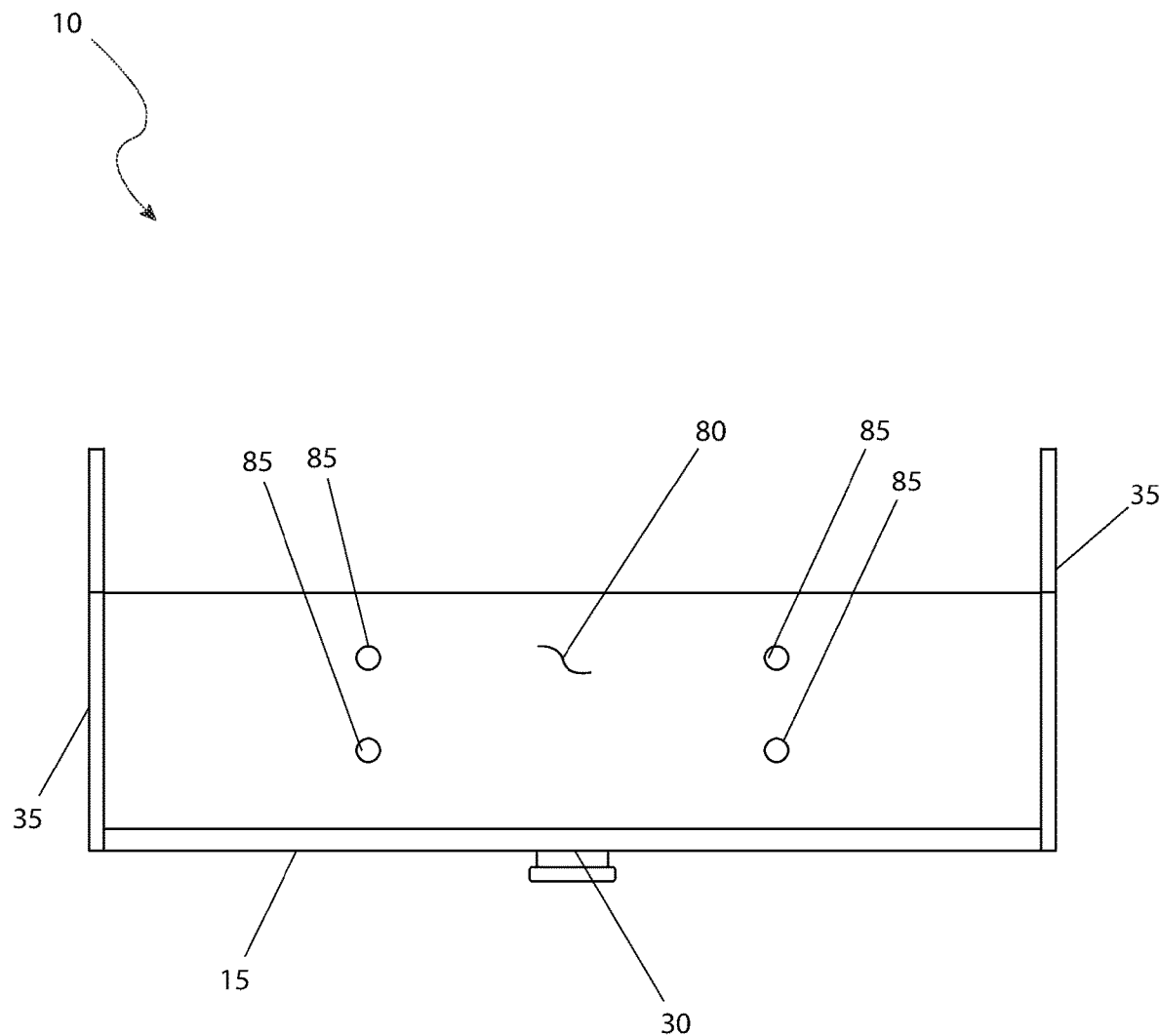
FIG. 3 is a top view of the snowplow mounting adapter 10, according to the preferred embodiment of the present invention.

Referring now to FIG. 3, a top view of the adapter 10, according to the preferred embodiment of the present invention is shown. A winch mounting plate 80 is bordered by the two (2) side mounting plates 35 as well the front plate 15. A set of four (4) winch mounting holes 85 are symmetrically located on the winch mounting plate 80 for rapid mounting of an aftermarket winch. Should additional winch mounting holes 85 be required for a specific make or model of winch, they may be easily drilled as needed by the final user. The receiver hitch 30 is visible in a central location as well. It is noted the adapter 10 allows for use of a winch and/or the receiver hitch 30 simultaneously. The specific use of a winch or the receiver hitch 30 is not intended to be a limiting factor of the present invention.

Figure 4:
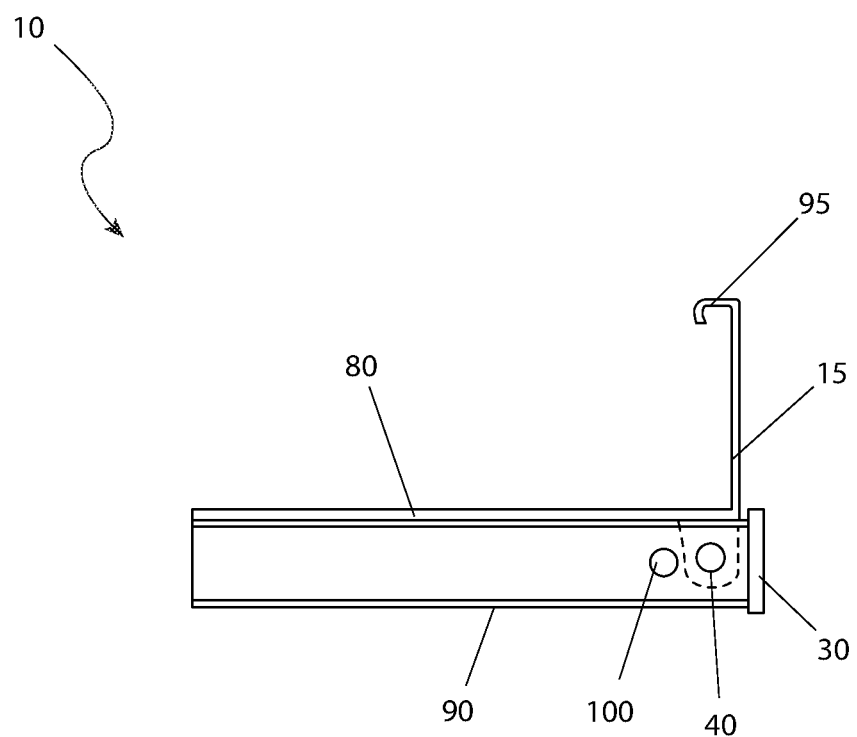
FIG. 4 is a sectional view of the snowplow mounting adapter 10, as seen along a Line I-I, as shown in FIG. 1, according to the preferred embodiment of the present invention; and, FIG. 5 is a perspective view of the snowplow mounting adapter 10, shown in an installed state, according to the preferred embodiment of the present invention.

Referring next to FIG. 4, a sectional view of the adapter 10, as seen along a Line I-I, as shown in FIG. 1, according to the preferred embodiment of the present invention is disclosed. A receiver tube 90 is attached to the underside of the winch mounting plate 80 and terminates at the receiver hitch 30 directly below the front plate 15. The top of the front plate 15 is provided with a reinforcing lip 95 for structural strength. A hitch locking pin hole 100 is provided in the receiver tube 90 for the insertion of a conventional hitch locking pin (not shown). Finally, the first safety attachment point 40 is shown near the front plate 15 via a dashed line due to its hidden state behind the receiver tube 90.

Figure 5:
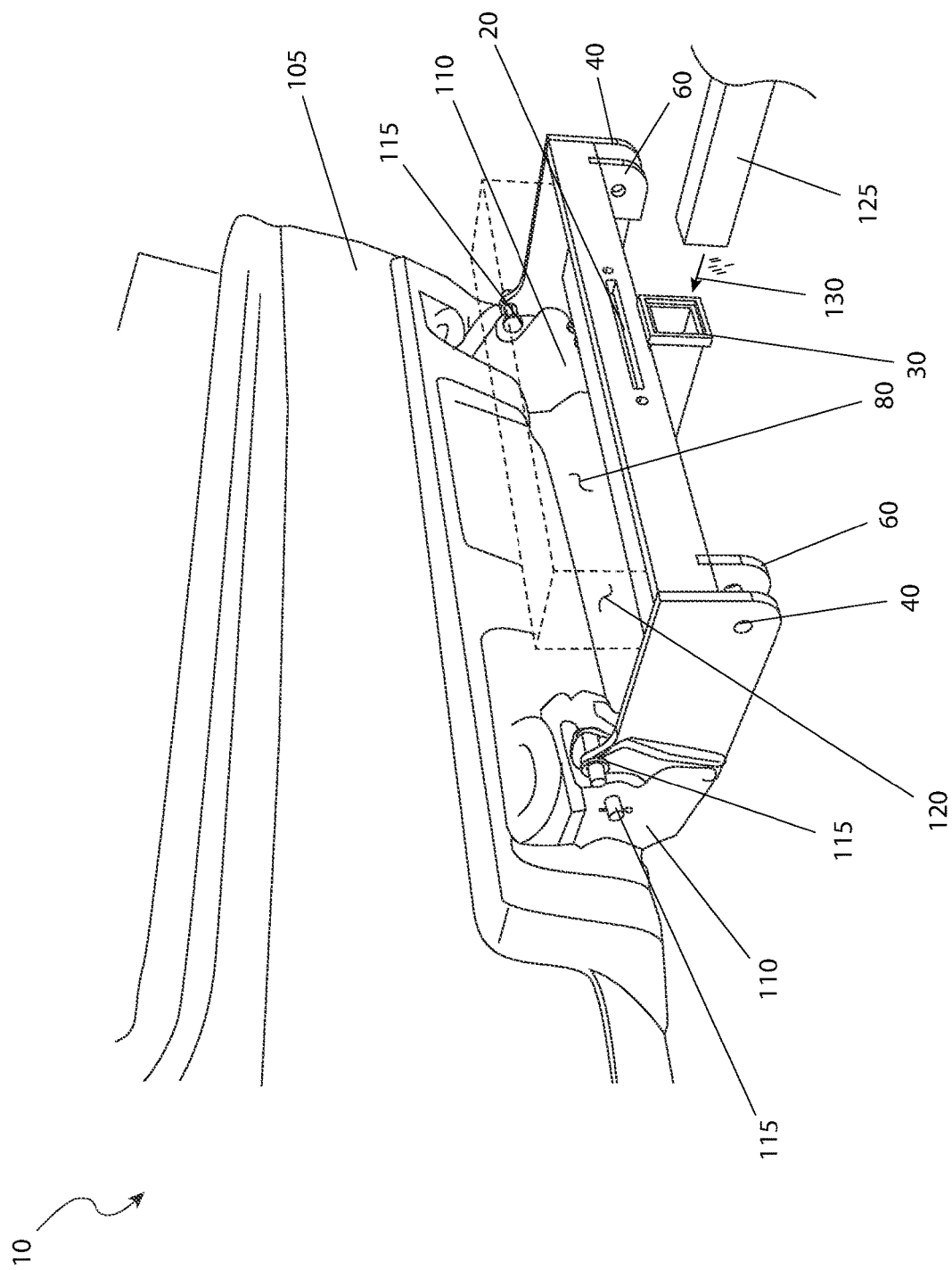

Referring finally to FIG. 5, a perspective view of the adapter 10, shown in an installed state, according to the preferred embodiment of the present invention is depicted. The adapter 10 is installed on the front of a motor vehicle 105 typically used for snow plowing duties such as a truck. The pin slot 70 and the securing hole 75 (both of which are not shown due to illustrative limitations) are attached to the snowplow mount 110 via a series of locking pins 115. As positioned, the winch mounting plate 80 provides for a winch mounting space 120 that accommodates nearly any make or model of winch with the winch cable using the winch cable opening 20. A hitch body 125 access the receiver hitch 30 via a hitch insertion path "i" 130 in a conventional manner where it is secured with a hitch pin in the hitch locking pin hole 100 (as shown in FIG. 4). The hitch body 125 can provide for the insertion of a hitch ball to allow for maneuvering of recreational vehicle trailers, boat trailers, utility trailers and the like. Other hitch bodies 125 such as bike racks, bumper storage racks, ladder racks, and the like may also be used with the receiver hitch 30 as well. Any safety chains (if provided) would attach to either the first safety attachment point 40 or the second safety attachment point 60. When the use of a snowplow is required, the adapter 10 is removed allowing use of the snowplow mount 110 in a conventional manner.

2. Operation of the Preferred Embodiment

The preferred embodiment of the present invention can be utilized by the common user in a simple and effortless manner with little or no training. It is envisioned that the adapter 10 would be constructed in general accordance with FIG. 1 through FIG. 5. The user would procure the adapter 10 from conventional procurement channels such as truck accessory supply houses, home improvement stores, hardware stores, mail order and internet supply houses and the like. Special attention would be paid to any specific dimensions and mating requirements of the snowplow mount 110.

After procurement and prior to utilization, the adapter 10 would be prepared in the following manner: the adapter 10 would be lifted into place on the snow plow mount 110 and secured via usage of the locking pins 115 in the pin slot 70 and the securing hole 75; cotter pins or other securing methods may also be used; if desired, a winch would be installed in the winch mounting space 120 and secured with bolts and nuts using the winch mounting holes 85; if desired, a hitch body 125 would be installed in the receiver hitch 30 and secured via another pin in the hitch locking pin hole 100. At this point in time, the adapter 10 is ready for use.

During utilization of the adapter 10, the following procedure would be initiated: the winch would be operated in a conventional manner if installed; the hitch body 125 with its attachments would also be operated in a conventional manner if installed. Simultaneous operation of both the winch and the receiver hitch 30 are envisioned as possible depending on the limitations of the installed devices.

After use of the adapter 10, the adapter 10 may be left in place and utilized as described above in a repeating and cyclical manner. Should the use of a snowplow on the motor vehicle 105 be required, the adapter 10 is removed by reversing the above-described process whereupon once again allowing use of the snowplow mount 110 for its original intended purpose.

The features of the adapter 10 provide: an easy to install front receiver; a simultaneous installation of a snowplow mount 110; increased flexibility and usability of a motor vehicle 105; and, reduced or eliminated mechanical work in converting from snowplow usage to winch or front receiver usage.

The foregoing descriptions of specific embodiments of the present invention have been presented for purposes of illustration and description. They are not intended to be exhaustive or to limit the invention to the precise forms disclosed, and obviously many modifications and variations are possible considering the above teaching. The embodiments were chosen and described to best explain the principles of the invention 10 and its practical application, to thereby enable others skilled in the art to best utilize the invention and various embodiments with various modifications as are suited to the particular use contemplated.

What is claimed is:

1. A snowplow mounting adapter, comprising:
   a front plate bordered by a pair of side mounting plates which are adapted to allow for connection of the snowplow mounting adapter to a snowplow mount;
   a winch cable opening bordered by a pair of attachment holes allowing for mounting of a winch behind the front plate;
   a standard receiver hitch disposed directly below the winch cable opening;
   a pair of first safety attachment points disposed inward from the pair of side mounting plates for attachment of one or more safety chains when using the receiver hitch;
   a winch mounting plate bordered by the pair of side mounting plates and the front plate;
   a set of 4 winch mounting holes disposed on the winch mounting plate to facilitate mounting of an aftermarket winch;
   a receiver tube attached underneath the winch mounting plate that terminates at the receiver hitch directly below the front plate; and
   a hitch locking pin hole disposed on the receiver tube for the insertion of a conventional hitch locking pin; and,
   wherein the pair of side mounting plates each include a top edge, a bottom edge, a forward-facing edge with a second safety attachment point, and a rearward facing edge with a lower pin slot.

2. The snowplow mounting adapter, according to claim 1, wherein a top portion of the rearward facing edge includes a securing hole which is adapted to accept a locking pin from the snowplow mount.

3. The snowplow mounting adapter, according to claim 2, wherein the securing hole includes an opening that is ¾ inch in diameter.

4. The snowplow mounting adapter, according to claim 1, wherein the front plate is 4 inches tall and 33 inches wide.

5. The snowplow mounting adapter, according to claim 1, wherein the winch mounting plate includes a winch mounting space that accommodates the winch with a winch cable using the winch cable opening.

6. The snowplow mounting adapter, according to claim 1, wherein the standard receiver hitch includes a diameter selected from the group consisting of 1¼ inches, 2 inches, 2½ inches, or 3 inches.

7. The snowplow mounting adapter, according to claim 1, wherein the set of 4 winch mounting holes are symmetrically disposed on the winch mounting plate.

8. The snowplow mounting adapter, according to claim 1, wherein a top of the front plate includes a reinforcing lip for structural strength.

9. The snowplow mounting adapter, according to claim 1, wherein the snowplow mounting adapter is adapted to attach to the snowplow mount on a motor vehicle.

10. The snowplow mounting adapter, according to claim 9, wherein the snowplow mounting adapter is adapted to be installed on a front of the motor vehicle.

11. The snowplow mounting adapter, according to claim 1, wherein the snowplow mounting adapter is welded together.

12. The snowplow mounting adapter, according to claim 1, wherein the snowplow mounting adapter includes a protective finish.

13. The snowplow mounting adapter, according to claim 12, wherein the protective finish is corrosion resistant paint.

14. The snowplow mounting adapter, according to claim 12, wherein the protective finish is corrosion resistant plating.

15. The snowplow mounting adapter, according to claim 1, wherein the snowplow mounting adapter allows for use of the winch and/or the receiver hitch.

16. The snowplow mounting adapter, according to claim 1, wherein the snowplow mounting adapter is made of high strength steel.

17. The snowplow mounting adapter, according to claim 1, wherein the snowplow mounting adapter is ⅜ inch thick.

\* \* \* \* \*